United States Patent
Yubo et al.

(10) Patent No.: US 12,475,518 B2
(45) Date of Patent: Nov. 18, 2025

(54) DISTRIBUTION GRID TOPOLOGY IDENTIFICATION ENCODING KNOWN TOPLOGIAL INFORMATION

(71) Applicant: Siemens Aktiengesellschaft, Munich (DE)

(72) Inventors: Yubo Yubo, Princeton, NJ (US); Ulrich Muenz, Princeton, NJ (US)

(73) Assignee: Siemens Aktiengesellschaft, Munich (DE)

( * ) Notice: Subject to any disclaimer, the term of this patent is extended or adjusted under 35 U.S.C. 154(b) by 586 days.

(21) Appl. No.: 17/848,941

(22) Filed: Jun. 24, 2022

(65) Prior Publication Data

US 2023/0018575 A1     Jan. 19, 2023

Related U.S. Application Data

(60) Provisional application No. 63/221,985, filed on Jul. 15, 2021.

(51) Int. Cl.
*H02J 3/00*     (2006.01)
*G06Q 50/06*     (2012.01)
*H02J 3/38*     (2006.01)

(52) U.S. Cl.
CPC .............. *G06Q 50/06* (2013.01); *H02J 3/381* (2013.01); *H02J 2203/10* (2020.01); *H02J 2203/20* (2020.01)

(58) Field of Classification Search
None
See application file for complete search history.

(56) References Cited

U.S. PATENT DOCUMENTS

| | | | |
|---|---|---|---|
| 9,287,713 B2 | 3/2016 | Sharon et al. | |
| 2020/0195007 A1 | 6/2020 | Sun et al. | |
| 2021/0141969 A1 | 5/2021 | Stahlfeld et al. | |
| 2022/0268827 A1* | 8/2022 | Sun ........................ | G01R 31/52 |

OTHER PUBLICATIONS

Li, Xiao, H. Vincent Poor, and Anna Scaglione. "Blind topology identification for power systems." In 2013 IEEE International Conference on Smart Grid Communications (SmartGridComm), pp. 91-96. IEEE, 2013.

(Continued)

*Primary Examiner* — Paul B Yanchus, III

(57) ABSTRACT

A computer-implemented method for identifying a topology of a power distribution grid having a number of transformers includes acquiring measurement signals of one or more electrical quantities pertaining to nodes of the power distribution grid. A graph representation is generated using the measurement signals and grid topological information, wherein the measurement signals pertaining to respective nodes are used to derive node features and the grid topological information is used to encode edges representing certain and uncertain connections between the nodes. The graph representation is processed using a graph neural network to classify the nodes and output a mapping of each of the nodes to one of the transformers, whereby a status of the uncertain connections is determined.

15 Claims, 6 Drawing Sheets

(56) References Cited

OTHER PUBLICATIONS

Jafarian, M., Soroudi, A. and Keane, A., Aug. 2020, Distribution system topology identification for der management systems using deep neural networks. In 2020 IEEE Power & Energy Society General Meeting (PESGM) (pp. 1-5). IEEE.

Kipf, N. Thomas et al: "Semi-Supervised Classification with Graph Convolutional Networks"; ICLR 2017; Feb. 22, 2017 (Feb. 22, 2017), XP055457092 / Feb. 22, 2017.

Youngjoo Seo et al.; "Structured Sequence Modeling With Graph Convolutional Recurrent Networks"; Under review as a conference paper at ICLR 2017.

Changgang Wang et al.; "Power System Network Topology Identification Based on Knowledge Graph and Graph Neural Network"; Frontiers in Energy Research | www.frontiersin.org; vol. 8, Article 613331; published: Feb. 17, 2021 / Feb. 17, 2021.

* cited by examiner

DISTRIBUTION GRID TOPOLOGY IDENTIFICATION ENCODING KNOWN TOPLOGIAL INFORMATION

TECHNICAL FIELD

The present disclosure relates generally to topology identification of power distribution grids. Disclosed embodiments specifically relate to methods, systems and computer program products for identifying network topology of power distribution grids using graph representations based on measurement data and known topological information.

BACKGROUND

Topology identification of power distribution girds refers to the problem of estimating the topology of a power distribution grid using grid measurement data. Topology identification is often a fundamental or preliminary step in many higher-level distribution systems applications, such as switching status validation, state estimation, active distribution system management, among others. For example, power flow results based on an incorrect network topology may significantly deviate from their operating points, with the potential for creating false alarms to operators, thus decreasing system security, and increasing the operational cost of distribution systems.

SUMMARY

Briefly, aspects of the present disclosure provide a scalable methodology for identifying network topology of a power distribution grid created by open and closed switching devices, by combining measurement signals with known topological information using graph representations.

According to a first aspect, a computer-implemented method is provided for identifying a topology of a power distribution grid comprising a plurality of transformers. The method comprises acquiring measurement signals of one or more electrical quantities pertaining to a plurality of nodes of the power distribution grid. The method further comprises generating a graph representation using the measurement signals and grid topological information, wherein the measurement signals pertaining to respective nodes are used to derive node features and wherein the grid topological information is used to encode edges representing certain and uncertain connections between the nodes. The method further comprises processing the graph representation using a graph neural network to classify the nodes and output a mapping of each of the nodes to one of the transformers, whereby a status of the uncertain connections is determined.

Other aspects of the disclosure implement features of the above-described method in systems and computer program products for power distribution grid topology identification.

Additional technical features and benefits may be realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The foregoing and other aspects of the present disclosure are best understood from the following detailed description when read in connection with the accompanying drawings. To easily identify the discussion of any element or act, the most significant digit or digits in a reference number refer to the figure number in which the element or act is first introduced.

DETAILED DESCRIPTION

Distribution system operators such as utility companies often have uncertain or incomplete knowledge of network topology of a power distribution grid. For example, the network topology of a power distribution grid may depend on often unknown variables such as the status of switching devices, such as circuit breakers, isolator switches, fuses, etc., that may define connections between transformer and loads.

Figure 1:
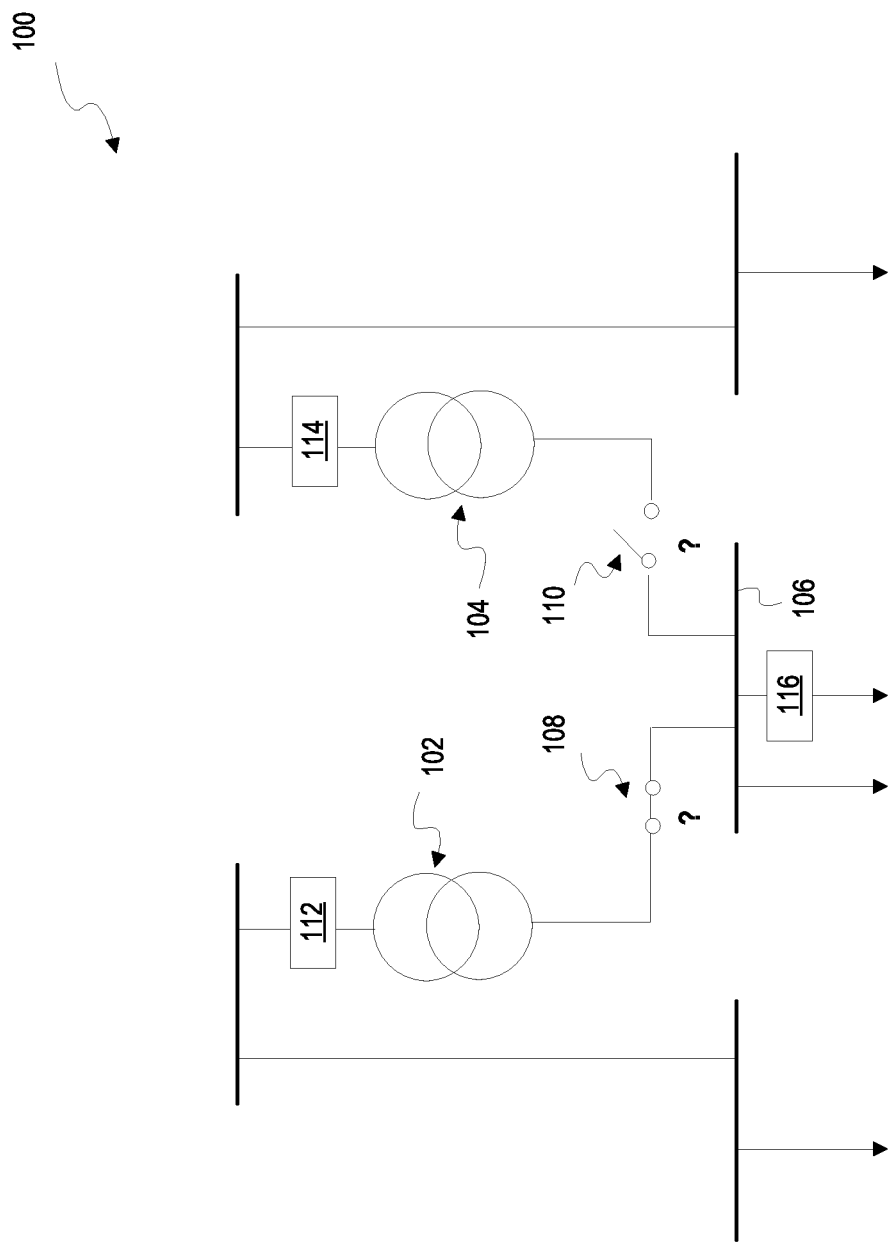
FIG. 1 illustrates an example use case for applying the disclosed methodology for topology identification of a power distribution grid.

An example scenario is illustrated in FIG. 1, which shows a small portion of a power distribution grid 100. The power distribution grid 100 may include multiple transformers, two of which are shown herein, designated as 102 and 104. A load on a bus 106 can be connected to one of the transformers 102, 104 via respective switching devices 108, 110. Due to the radial constraint of distribution systems, a load cannot be connected to more than one transformer at the same time. Thus, in this example, only one of the switching devices 108, 110 can be closed at any time. During a distribution contingency, the load that is originally connected to the transformer 102, can be disconnected from transformer 102 and connected to the transformer 104 by changing the position of the switching devices 108, 110. With the prevailing existence of manual switches in distribution systems, the status of each and every switching device of the power distribution grid 100 may not be known. Together with many other switching devices not shown in FIG. 1, a distribution system operator can assume the circuit is under certain topology, which could be erroneous due to the wrongly documented status of the switching devices.

The problem of topology identification refers to the problem of estimating the topology of a power distribution grid using measurement data. Known approaches to the problem have been broadly based on clustering of nodes or meters using the collected measurement data pertinent to the respective nodes or meters. Known studies have typically involved constraint-based optimization solvers which can be complex and challenging to scale to large distribution systems. The disclosed methodology combines measurement signals with known topological information by way of graph representations, which can be processed by a graph neural network to infer the network topology by classifying the nodes of the graph representation based on association with one of the transformers. The disclosed methodology can utilize parallel processing by a suitable processor (e.g., a GPU), making it computationally fast and scalable to large distribution systems. Furthermore, the disclosed methodology has been shown to provide higher prediction accuracy than clustering methods that do not leverage known topological information.

A power distribution grid topology can be effectively represented as a tree graph defined by nodes (i.e., buses) interconnected by edges (e.g., lines, transformers). The disclosed methodology can be implemented where distribution system operators possess a rough knowledge of the grid topology (i.e., multiple topology hypotheses exist), to identify a topology that best fits the measurement signals. The grid topological information used by the disclosed methodology may be indicative of some known connections between nodes. The grid topological information may also be utilized to create multiple topology hypotheses based on unknown but feasible connections between nodes. In the context of this description, the known connections are referred to as "certain" connections and the unknown but feasible connections as referred to as "uncertain" connections. For example, consistent with disclosed embodiments, a power distribution grid may comprise a number of switching devices where "certain" connections between nodes may include non-switchable or fixed connections while "uncertain" connections between nodes may include switchable connections (i.e., where an edge is realized via a switching device).

The disclosed methodology is based on generating a graph representation using the grid topological information and measurement signals of one or more electrical quantities pertaining to nodes of the power distribution grid that have associated measurement devices. The measurement signals pertaining to respective nodes are used to derive node features of the graph representation. The grid topological information is used to encode the edges representing certain and uncertain connections between the nodes. Thus, in the graph representation, edges may be assumed to exist for both certain and uncertain connections between nodes. The edges may be encoded with edge features (e.g., edge weights) to distinguish the certain connections from the uncertain connections. The generated graph representation is processed by a graph neural network to classify the nodes and output a mapping of each of the nodes to one of the transformers, whereby a status of the uncertain connections may be determined.

A graph neural network may be characterized by its ability to learn not only from properties or features of data points, but also from the relationship or connections between data points. A graph neural network may be based on a number of graph learning methods include, broadly speaking, deep learning-based methods, graph signal processing-based methods, random walk-based methods, among others. Consistent with disclosed embodiments, the graph neural network in the present application may include a graph convolutional network. According to disclosed embodiments, the graph neural network may be used to classify nodes of an input graph representation, by training the model on a node classification task in a supervised or semi-supervised learning process using training graphs with at least a small number of labeled nodes.

Figure 2:
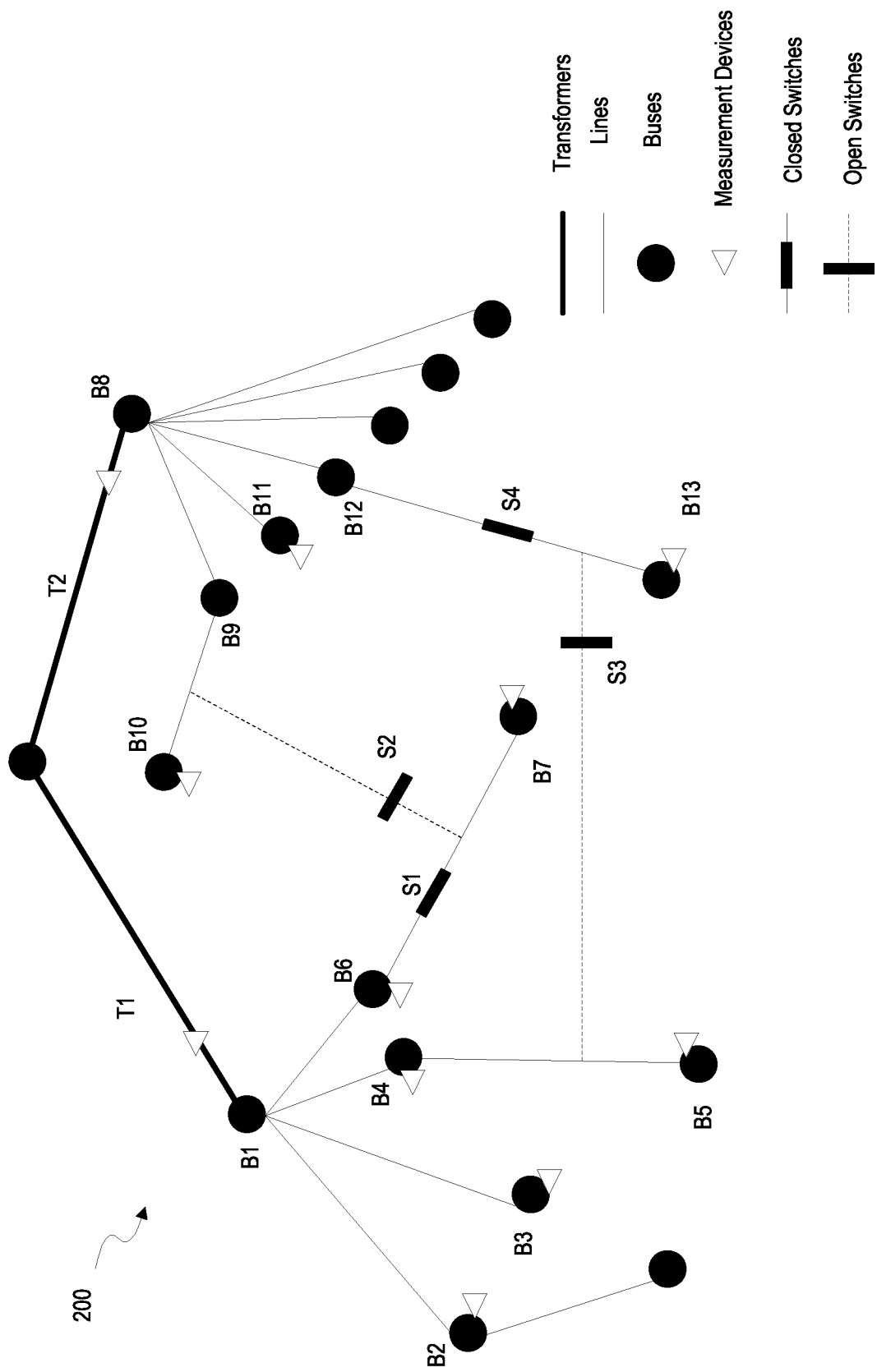
FIG. 2 shows an illustrative example of a network topology of portion of a power distribution created by open and closed switching devices.

Turning now to the disclosed embodiments, FIG. 2 shows an example of a tree topology of a portion of power distribution grid 200. The shown portion of the topology includes two transformers T1, T2 and a number of nodes (i.e., buses) interconnected by lines (i.e., power lines), where each of the nodes is connected to one of the transformers T1, T2. At least some of the nodes are measured "nodes", i.e., nodes being associated with measurement devices for measuring one or more electrical quantities pertaining to the respective nodes. The measured noes are designated as B1, B2, B3, B4, B5, B6, B7, B8, B9, B10, B11, B12 and B13. In the shown topology, the measured nodes B1-B7 are connected to the transformer T1 while the measured nodes B8-B13 are connected to the transformer T2. The unmeasured nodes are not designated in FIG. 2 for clarity.

In the illustrative example, the nodes B1 and B8 are directly connected to the secondary or output side of the transformer T1 and T2 respectively and may be measured, for example, via remote terminal units (RTUs) connected to the transformers T1 and T2. Other nodes may be measured via respective meters connected to these nodes, which may include, for example, smart metering infrastructure (SMI) devices. The disclosed methodology is however not constrained by the arrangement and modality of the measurement devices and, in many embodiments, may be adapted to existing metering infrastructure of the grid.

As is typical, the power distribution grid 200 may include a large number of switching devices, four of which are shown in FIG. 2, designated as S1, S2, S3 and S4. In the shown topology, switching devices S1 and S4 are closed and switching devices S2 and S3 are open, whereby node B7 is connected to transformer T1 and node B13 is connected to transformer T2. Depending on the status of the switching devices S1, S2, S3, S4, a number of different topology hypotheses may be defined. For example, according to one hypothesis, node B7 may be connected to transformer T2 by closing switch S2 and opening switch S1 (to preserve radial constraint), while node B13 remains connected to transformer T2. According to another hypothesis, node B13 may be connected to transformer T1 by closing switch S3 and opening switch S4 (to preserve radial constraint), while node B7 remains connected to transformer T1. According to yet another hypothesis, nodes B7 and B13 may be swapped between transformers T1 and T2 from the configuration shown in FIG. 2.

As seen above, the different topology hypotheses may define different mappings of nodes to transformers. Topology identification, as per the disclosed methodology, may involve using measurement signals from the various measurement devices and the known topological information to determine a mapping of nodes to transformers. The status of the uncertain connections can be thereby determined, which, in the illustrated example, may be indicative of the status of the switching devices.

Figure 3:
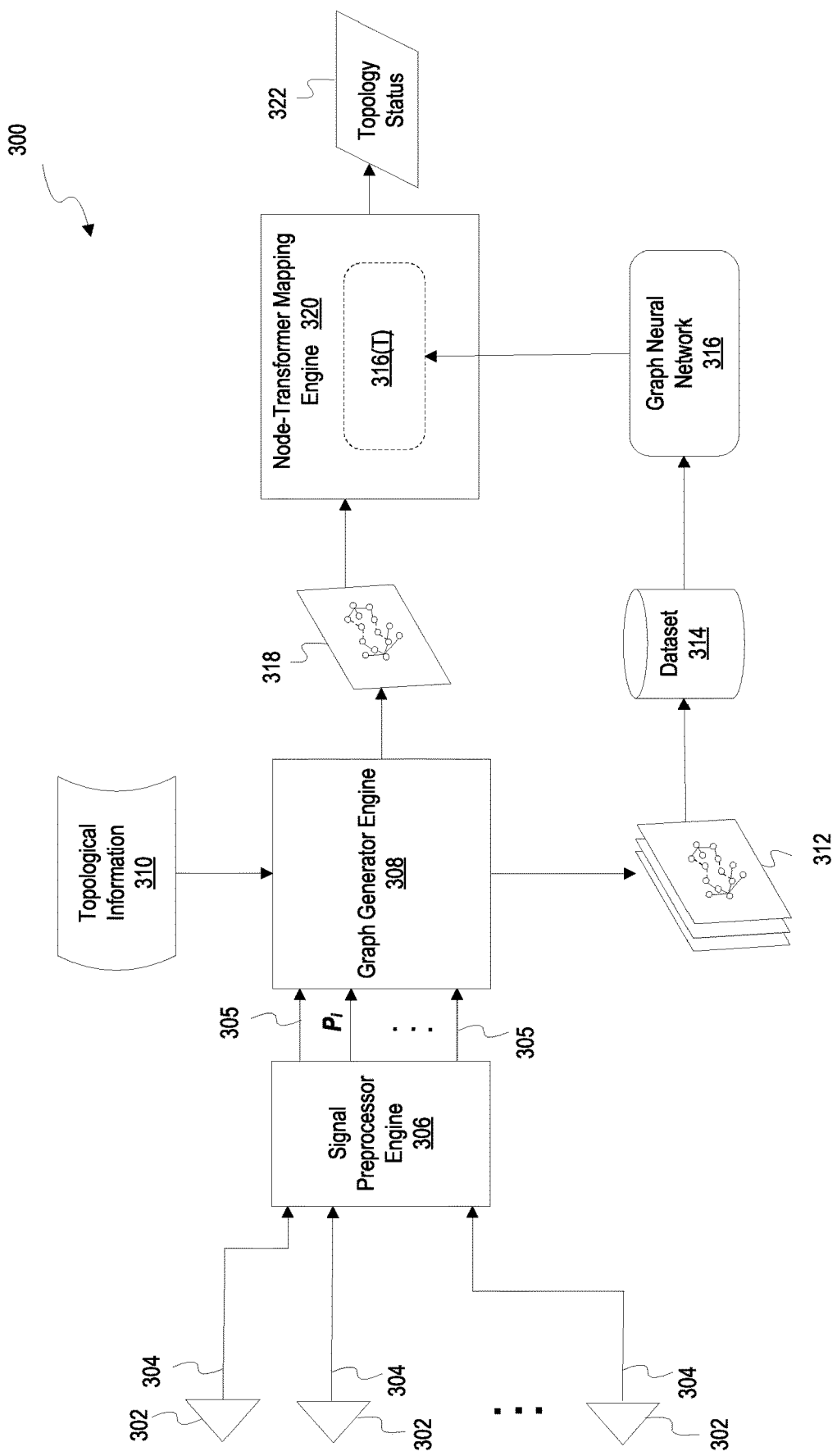
FIG. 3 illustrates an example of a system for identifying a topology of a power distribution grid according to disclosed embodiments.

FIG. 3 illustrates a system 300 for identifying a topology of a power distribution grid according to disclosed embodiments. The various engines described herein, including the signal preprocessor engine 306, the graph generator engine 308 and the node-transformer mapping engine 320, including components thereof, may be implemented by a computing system in various ways, for example, as hardware and programming. The computing system may, for example, be part of a grid management system. The programming for the engines 306, 308 and 320 may take the form of processor-executable instructions stored on non-transitory machine-readable storage mediums and the hardware for the engines may include processors to execute those instructions. The processing capability of the systems, devices, and engines described herein, including the signal preprocessor engine 306, the graph generator engine 308 and the node-transformer mapping engine 320 may be distributed among multiple system components, such as among multiple processors and memories, optionally including multiple distributed processing systems or cloud/network elements.

Referring to FIG. 3, the system 300 may include a number of measurement devices 302 configured to communicate measurement signals 304 pertaining to measured nodes of the power distribution grid. As described above, the measurement devices 302 may, in many cases, include multiple modalities of measurement devices.

In many embodiments, as a preliminary step, the raw measurement signals 304 may be preprocessed by a signal preprocessor engine 306, which may execute conventional signal preprocessing steps such as denoising to remove noisy data, interpolation to fill in missing data, among others. In some embodiments, for example, when different modalities of measurement devices 302 are used, the signal preprocessing engine 306 may be configured to resample at least some of the measurement signals 304 to achieve a consistent sampling frequency between the measurement signals 304. The signal preprocessor engine 306 may thus output preprocessed measurement signals 305 pertaining to the various nodes as respective time series data with a defined sampling frequency.

In the remainder of the description of the disclosed embodiments, the term "measurement signal" or simply "signal" refers to a preprocessed measurement signal 305, unless otherwise specified.

In disclosed embodiments, the electrical quantity being measured for each node includes only active power (load). Load measurements may be readily available from utilities and may have a significant contribution to correlating measurement signals to transformers. The measurement signals 305 in this case include time series data $P_i$ corresponding to power measurement at each node i. In some embodiments, multiple electrical quantities may be measured, that may define multiple channels of measurement signals per measured node. In one suitable implementation, the electrical quantities being measured can include active power and voltage. Voltage is also a highly correlated variable, and a combination of voltage and active power measurements may provide higher prediction accuracies than measurement of active power alone.

The graph generator engine 308 may be configured to generate graph representations of the grid topology based on the measurement signals 305 and grid topological information 310. According to disclosed embodiments, the graph generator engine 308 may be configured to process the measurement signals 305 to derive node features of the nodes of the graph representation. The grid topological information 310 may be used to encode edges representing certain and uncertain connections between the nodes. In many embodiments, a power distribution gird may comprise unmeasured nodes, in addition to measured nodes. The graph representation may include only the measured nodes.

Figure 4:
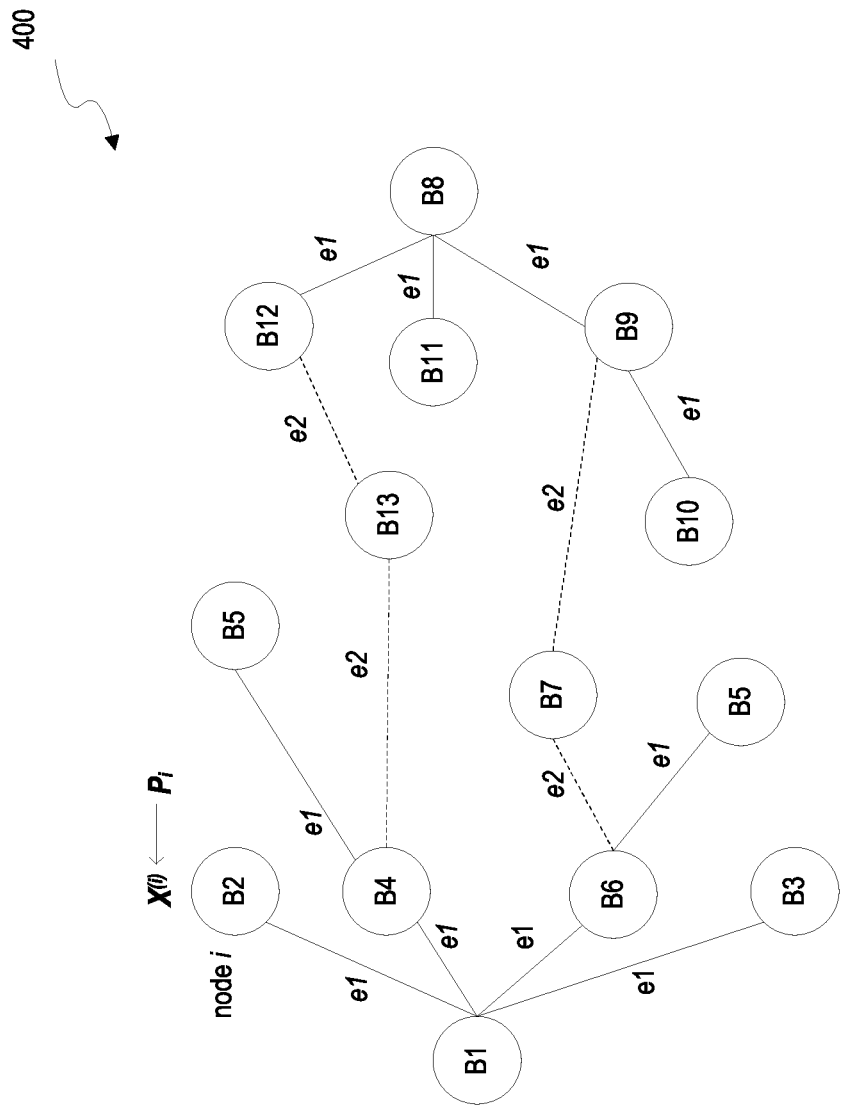
FIG. 4 illustrates a graph representation of the network topology shown in FIG. 2 according to disclosed embodiments.

As stated above, the grid topological information 310 may comprise information on the certain connections between nodes, as well as the uncertain connections between nodes that may define multiple topology hypotheses. Continuing with the example topology shown in FIG. 2, a corresponding graph representation is shown in FIG. 4. The graph representation 400 includes, as nodes, the measured nodes B1-B13. In FIG. 4, the edges depicted by bold lines represent certain connections and the edges depicted by dashed lines represent uncertain connections as derived from the grid topological information 310. In the present example, the certain connections include non-switchable connections, and the uncertain connections include connections that are realized via a switching device. For example, as shown, node B7 has uncertain connections with nodes B6 and B9 that can be realized via the switching devices S1 and S2 respectively. Likewise, the node B13 has uncertain connections with nodes B4 and B12 that can be realized by the switching devices S3 and S4 respectively. Note that connections realized by both, normally closed and normally open switching devices, may be defined as uncertain connections.

The edges may be encoded with edge features to distinguish the certain connections from the uncertain connections. According to disclosed embodiments, an edge feature may comprise a scalar, referred to as "edge weight", assigned to each edge. As shown in FIG. 4, the edges representing certain connections ("certain edges") may be assigned a first edge weight e1 and the edges representing uncertain connections ("uncertain edges") may be assigned a second edge weight e2, where e2 is less than e1. The assignment of edge weights can ensure that in the graph neural network (described below), message propagation along the certain edges has a higher weight in comparison to message propagation along the uncertain edges. In other embodiments, the edge features may comprise vectors that may define further relationships between the adjacent nodes of an edge.

The node features of each node of the graph representation 400 may be derived from the time series data defined by respective measurement signals 305. In the present example, the measurement signal pertaining to a node i may comprise time series data $P_i$ corresponding to power measurements. The node features of the node i may comprise a feature vector $X^{(i)}$ derived from the time series data $P_i$ sampled over a defined time window (e.g., 1 day, 10 days, etc.).

According to a disclosed embodiment, the measurement signal 305 pertaining to each node i may be processed to transform the time series data $P_i$, into spectral embeddings which define the respective feature vectors $X^{(i)}$ for each node i. The spectral embeddings may be determined based on computing a similarity measure $m_{i,j}$ between the signals $P_i$, $P_j$ pertaining to each pair of nodes i, j. An example method for processing the measurement signals to determine spectral embeddings is described below.

As a first step, a similarity matrix $M \in \mathbb{R}^{N \times N}$ may be computed, where N is the number of (measured) nodes, and wherein the rows and columns of the matrix M correspond to the nodes. Each entry $m_{i,j}$ of the similarity matrix M may include a computed similarity measure between signals $P_i$ and $P_j$ pertaining to a pair of nodes i, j. The similarity measure $m_{i,j}$ may be determined using various state-of-the-art methods. In one suitable implementation, the similarity measure $m_{i,j}$ may be determined by the well-known Pearson correlation between the signals $P_i$ and $P_j$. Other approaches may include determining the similarity measure $m_{i,j}$ as a Euclidean distance or a cosine distance between the signals $P_i$ and $P_j$, among other methods.

The similarity matrix M may thus represent a fully connected graph, referred to as "similarity graph", defining connections between each pair of nodes i, j. This representation may be useful to capture correlations (similarities) even between nodes that may not be physically directly connected. For example, referring to FIG. 2, a signal profile of the node B2 may be more similar to the signal profile of the node B1 (e.g., may have concurrent spikes) than the signal profile of the node B9 which has no direct connection with B2. However, there may still exist a non-zero correlation between the signals from B2 and B9 as a result of their topological connection, which may be captured in the similarity graph. With increasing size of the similarity graph, it may be harder to determine actual physical connections between nodes. This issue may be suitably addressed by the disclosed embodiment of using a combination of known topological information with spectral embeddings of the nodes to classify the nodes.

From the similarity matrix M, a graph Laplacian L may be computed as L=D−M, where D is a diagonal matrix with $d_{ii}=\Sigma_{j=1}^{N} m_{i,j}$. In some embodiments, the graph Laplacian L may be normalized as $L_{norm}=D^{-1/2} LD^{-1/2}$. To determine the spectral embeddings, eigenvectors $v_1, \ldots v_k$ may be computed corresponding to k smallest eigenvalues $\lambda_1, \ldots \lambda_k$ of the normalized graph Laplacian $L_{norm}$, where k may comprise an empirically determined integer value. Using the eigenvectors, a matrix V may be computed as $V=[v_1, \ldots v_k] \in R^{N \times k}$. The spectral embeddings for a node i may be determined by extracting the $i^{th}$ row of the matrix V, which may define the vector $X^{(i)}$ for the node i.

In an alternate embodiment, the node feature vector $X^{(i)}$ for each node i can be defined directly by the data samples of the time series data $P_i$ of the respective measurement signal 305, sampled over a defined time window. Such a graph representation can be suitably processed, for example, via a recurrent neural network (RNN)-based graph neural network.

In embodiments where multiple electrical quantities are measured, the measurement signals 305 may define multiple channels of time series data. For example, when voltage and active power are measured, the measurement signals 305 may define four channels of time series data (one channel for power and one channel each for three phases of voltage). In these embodiments, the node features may be obtained by concatenating the feature vectors derived from the individual channels.

Turning back to FIG. 3, the graph generator engine 308 may be used to create a dataset 314 comprising a number of graph representations 312 using the grid topological information 310 and measurement signals 304 collected over different time windows. Thus, each graph representation 312 of the dataset 314 may be generated based on node features derived from a time series of measurement signals sampled over a respective time window (e.g., as described above). In embodiments, the different time windows may have a fixed size and may be overlapping or non-overlapping. The edge features may be constant in the graph representations 312 as the grid topological information 310 typically does not change with time. The dataset 314 may be used to train a graph neural network 316. According to the disclosed embodiment, the graph neural network 316 may include a graph convolutional network (GCN).

A GCN may comprise a neural network structure for each node i defined by a local neighborhood of the node i in the graph representation. The neural network may have a depth (i.e., number of layers) defined by the number hops h information is propagated along. A feature representation of the respective nodes may be determined at each layer. At the input layer (layer 0), the feature representation of each node i may comprise the respective input feature vector $X^{(i)}$. At each subsequent layer, the feature representation of each node may be determined by aggregating messages (feature representations) propagated from its neighboring nodes and itself in the previous layer via respective edges. As per disclosed embodiments, the aggregation at each layer may be implemented by applying the edge weight (e1 or e2) assigned to the respective edges along which messages are propagated. For example, the aggregation may include a weighted summation of messages based on the edge weights of the edges along which messages are propagated. The aggregated message may be transformed using trainable neural network parameters (including weights and biases of that layer) and applying a non-linearity function (e.g., ReLu) to obtain the feature representation at the given layer. At layer h (h=number of hops), the feature representation of each node may define a final embedding of the node.

Since edges are assumed to exist for both certain and uncertain connections, message propagation may still be possible along the uncertain edges. The edge weights e1, e2 may ensure that the message propagation along the certain edges has a higher weight or importance in comparison to message propagation along the uncertain edges. In the process of graph learning, the trainable neural network parameters may be adjusted whereby the model may learn the importance or "certainty" of the edges based on the node features.

In at least some embodiments, the graph neural network 316 may be trained in a semi-supervised learning process wherein some of the nodes in the dataset 314 are assigned ground truth labels. The ground truth label of a node may indicate which transformer the node is mapped to. The graph neural network 316 may comprise an output layer (typically, a dense layer) that outputs predictions for the nodes. The predicted outputs over the labeled nodes may be used to compute a loss function, such as a cross-entropy loss function. The learning process may comprise iteratively adjusting the trainable neural network parameters, for example, using a method of gradient descent, over a first subset of the graph representations 312 in the dataset 314, such that the loss function is minimized. The trained graph neural network 316 may be tested on a second subset of the of the graph representations 312 in the dataset 314.

In some cases, distribution system operators may have knowledge of nodes having known association or mapping to respective transformers that are not impacted by uncertain connections (e.g., by status of switching devices), i.e., nodes connected to transformers via "certain" edges. Such nodes may be assigned ground truth labels for training the graph neural network 316.

However, in many situations, distribution system operators may not have knowledge about any of the node labels, except for "transformer nodes". A transformer node is a node directly connected to a transformer, either on the primary side or on the secondary side (e.g., nodes B1 and B8). In this scenario, the nodes assigned ground truth labels during the training of the graph neural network 316 may include only the transformer nodes. During model training, the loss function may be computed using only the predicted output over the transformer nodes. In an example experimental setup for this scenario, the trained model achieved an overall prediction accuracy of about 83% across all nodes. Thus, the disclosed methodology is seen to produce relatively satisfactory results with only a small number of node labels.

In another scenario, distribution system operators may have full knowledge of the network topology for a limited period of time only. In this case, the graph neural network 316 may be trained using fully labeled graph representations 312 (i.e., all nodes assigned ground truth labels) generated during this limited period of time, in a supervised learning process. The trained model may be tested on subsequently generated unlabeled graph representations 312. In an example experimental setup for this scenario, the trained model achieved a prediction accuracy of about 86% across all nodes.

In some embodiments, the node features of the graph representations 312 may be defined directly by data samples of respective time series data. In these embodiments, the graph neural network 316 may include an RNN-based graph neural network (graph-RNN). An example of a graph-RNN suitable for the present application may include a graph convolutional recurrent network (GCRN). As may be now apparent to one skilled in the art, an RNN-based graph neural network may be trained on node classification using the graph representations 312, in a supervised or semi-supervised learning process similar to that described above.

Still referring to FIG. 3, the trained and tested graph neural network 316(T) may be deployed to a runtime system including a node-transformer mapping engine 320. The deployed model 316(T) may have the same architecture as the model 316 used for training, including, in this case, the trained neural network weights.

Consistent with disclosed embodiments, the process of topology identification may involve acquiring real time measurement signals 304 pertaining to measured nodes of the power distribution grid via respective measurement devices 302. The real time measurement signals 304 may be sampled over a defined time window and preprocessed by the signal preprocessor engine 306 to produce respective preprocessed measurement signals 305 comprising time series data with a defined sampling frequency. The graph generator engine 308 may combine the preprocessed measurement signals 305 with the grid topological information 310 to generate a real time graph representation 318 as previously described. The node-transformer mapping engine 320 may use the graph neural network 316(T) for processing the graph representation 318 to classify all of the nodes in the graph representation 318 and output a topology status 322. The topology status 322 may indicate a mapping of each of the nodes to one of the transformers. The mapping may be used to determine a network topology and thereby determine the status of uncertain connections, such as the status of switching devices.

In embodiments, measurement signals 304 may be continuously sampled over a moving time window to detect network topology changes in real time. The identified network topology may be used to operate a power distribution grid, for example, by executing state estimations and implementing various control actions. In one example application, the status of the uncertain connections, such as the status of the switching devices, may be used to restore continuity in the power distribution grid following a grid contingency that may have led to a change in network topology, for example, due to a change of status of one or more of the switching devices.

Figure 5:
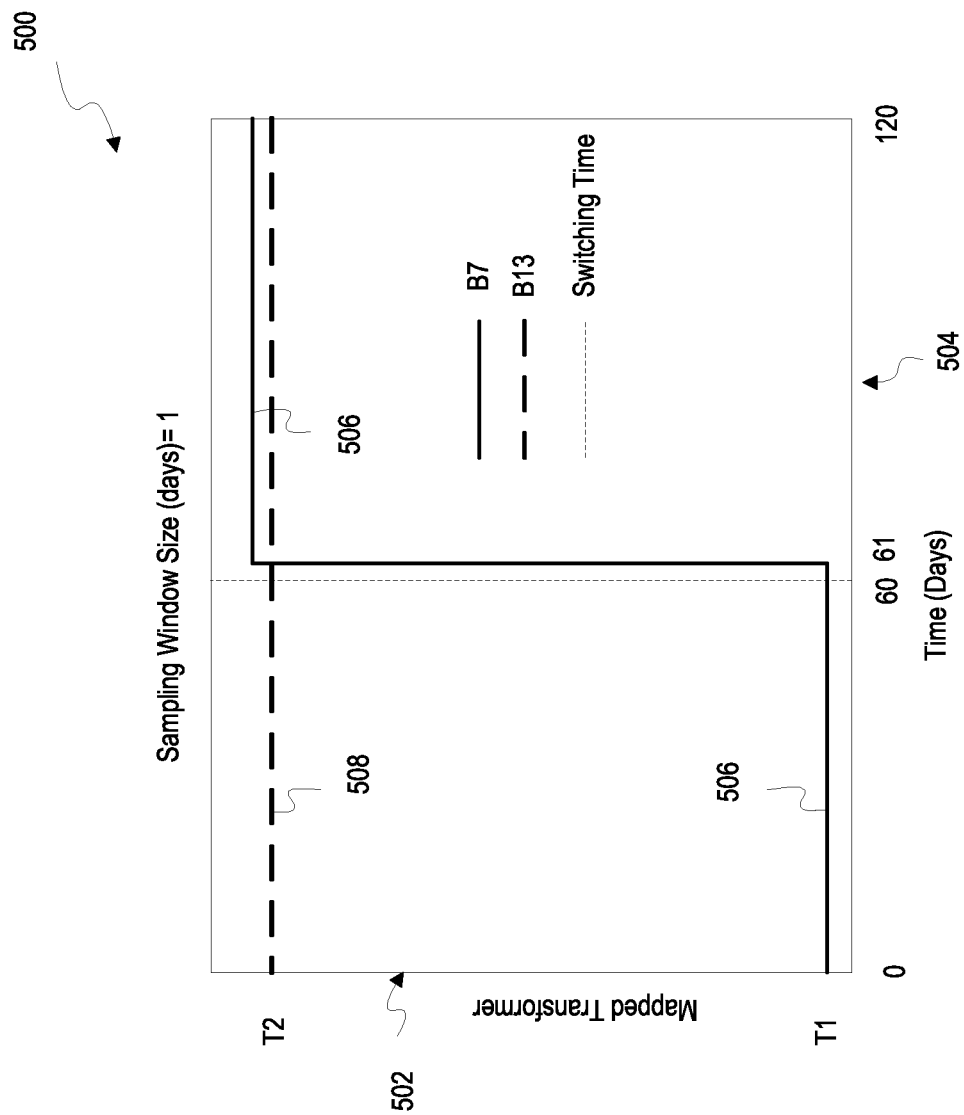
FIG. 5 illustrates an example visualization of a mapping of nodes to transformers according to disclosed embodiments.

FIG. 5 illustrates an example visualization 500 of an output of the node-transformer mapping engine 320, based on the network topology introduced in FIG. 2. In the visualization 500, the axis 502 represents transformers (in this case, transformers T1 and T2) to which nodes are to be mapped, and the axis 504 represents time in days. The plot 506 indicates a status of the node B7 and the plot 508 indicates a status of the node B13. The visualization 500 shows only the status of the nodes B7 and B13 for illustration. The status of other nodes may be similarly visualized.

As shown, initially, the node B7 is connected to the transformer T1 and the node B13 is connected to the transformer T2, consistent with the network topology shown in FIG. 2. On day 60, the node B7 is disconnected from the transformer T1 and connected to the transformer T2. The switching action is realized in this case by changing the position of the switches S1 and S2 shown in FIG. 2. As shown in FIG. 5, using a sampling window size of 1 day, the change in topology due to the switching action is detected quickly (on day 61). In general, based on the quality of data, the disclosed methodology can accurately identify topology changes between 1-10 days.

Figure 6:
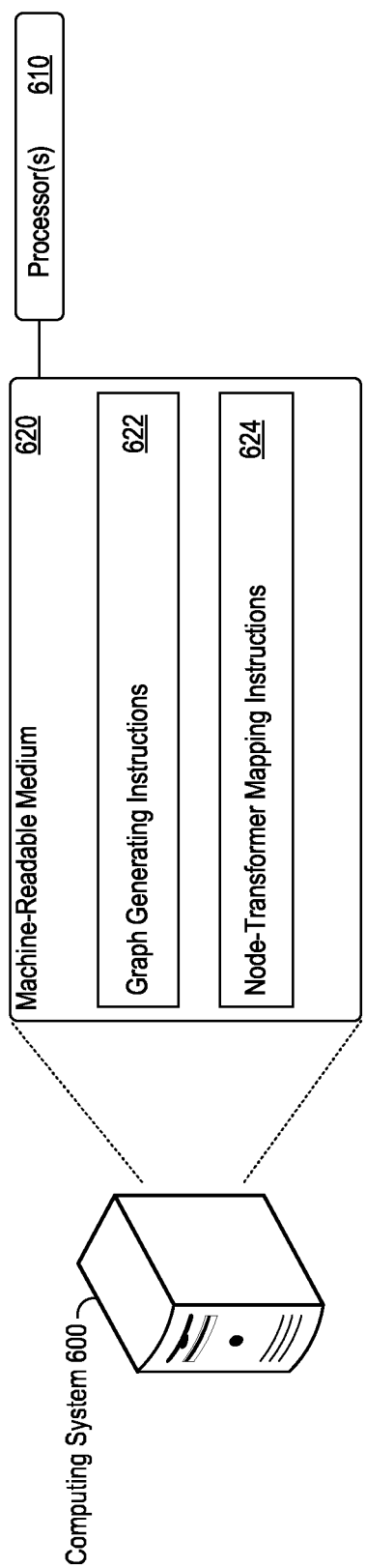
FIG. 6 illustrates a computing system that can support identification of a topology of a power distribution grid according to disclosed embodiments.

FIG. 6 shows an example of a computing system 600 that can support topology identification of a power distribution grid according to disclosed embodiments. The computing system 600 may, for example, form part of a distribution management system. The computing system 600 includes at least one processor 610, which may take the form of a single or multiple processors. The processor(s) 610 may include a central processing unit (CPU), a graphics processing unit (GPU), a neural processing unit (NPU), a microprocessor, or any hardware device suitable for executing instructions stored on a memory comprising a machine-readable medium. The computing system 600 further includes a machine-readable medium 620. The machine-readable medium 620 may take the form of any non-transitory electronic, magnetic, optical, or other physical storage device that stores executable instructions, such as graph generating instructions 622 and node-transformer mapping instructions 624, as shown in FIG. 6. As such, the machine-readable medium 620 may be, for example, Random Access Memory (RAM) such as a dynamic RAM (DRAM), flash memory, spin-transfer torque memory, an Electrically-Erasable Programmable Read-Only Memory (EEPROM), a storage drive, an optical disk, and the like.

The computing system 600 may execute instructions stored on the machine-readable medium 620 through the processor(s) 610. Executing the instructions (e.g., the graph generating instructions 622 and the node-transformer mapping instructions 624) may cause the computing system 600 to perform any of the technical features described herein, including according to any of the features of the graph generator engine 308 and the node-transformer mapping engine 320 described above.

The systems, methods, devices, and logic described above, including the graph generator engine 308 and the node-transformer mapping engine 320, may be implemented in many different ways in many different combinations of hardware, logic, circuitry, and executable instructions stored on a machine-readable medium. For example, these engines may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. A product, such as a computer program product, may include a storage medium and machine-readable instructions stored on the medium, which when executed in an endpoint, computer system, or other device, cause the device to perform operations according to any of the description above, including according to any features of the graph generator engine 308 and the node-transformer mapping engine 320. Computer readable program instructions described herein can be downloaded to respective computing/processing devices from a computer readable storage medium or to an external computer or external storage device via a network, for example, the Internet, a local area network, a wide area network and/or a wireless network.

The processing capability of the systems, devices, and engines described herein, including the graph generator engine 308 and the node-transformer mapping engine 320 may be distributed among multiple system components, such as among multiple processors and memories, optionally including multiple distributed processing systems or cloud/network elements. Parameters, databases, and other data structures may be separately stored and managed, may be incorporated into a single memory or database, may be logically and physically organized in many different ways, and may be implemented in many ways, including data structures such as linked lists, hash tables, or implicit storage mechanisms. Programs may be parts (e.g., subroutines) of a single program, separate programs, distributed across several memories and processors, or implemented in many different ways, such as in a library (e.g., a shared library).

Although this disclosure has been described with reference to particular embodiments, it is to be understood that the embodiments and variations shown and described herein are for illustration purposes only. Modifications to the current design may be implemented by those skilled in the art, without departing from the scope of the patent claims.

What is claimed is:

1. A computer-implemented method for identifying a topology of a power distribution grid comprising a plurality of transformers, the method comprising:
    acquiring measurement signals of one or more electrical quantities pertaining to a plurality of nodes of the power distribution grid,
    generating a graph representation using the measurement signals and grid topological information, wherein the measurement signals pertaining to respective nodes are used to derive node features and wherein the grid topological information is used to encode edges representing connections between the nodes, the encoding configured to distinguish certain connections from uncertain connections, and
    processing the graph representation using a graph neural network to classify the nodes and output a mapping of each of the nodes to one of the transformers, whereby a status of the uncertain connections is determined,
    wherein the measurement signals are continuously sampled over a moving time window to detect power distribution grid topology changes in real time.

2. The method according to claim 1, wherein the edges of the graph representations are encoded by assigning edge weights to respective edges, the edge weights defined by a first weight assigned to edges representing certain connections between adjacent a second weight assigned to edges representing uncertain connections, the second weight being less than the first weight.

3. The method according to claim 1, wherein the power distribution grid comprises a number of switching devices, wherein uncertain connections are represented by edges that are realized via a switching device, and wherein the determined status of the uncertain connections is indicative of a status of the switching devices.

4. The method according to claim 1, wherein the graph neural network is trained on a dataset comprising a number of graph representations generated using measurement signals collected over different time windows and the grid topological information.

5. The method according to claim 4, wherein the graph neural network is trained in a supervised or semi-supervised learning process wherein at least some of the nodes in the dataset are assigned ground truth labels indicative of a transformer mapping.

6. The method according to claim 5, wherein the nodes assigned ground truth labels during the training of the graph neural network include "transformer nodes" that are directly connected to a primary or secondary side of the transformers.

7. The method according to claim 5, wherein the nodes assigned ground truth labels during the training of the graph neural network includes nodes having known associations with transformers that are not impacted by uncertain connections.

8. The method according to claim 1,
    wherein the measurement signals pertaining to respective nodes comprise time series data, and
    wherein the node features are determined by processing the time series data pertaining to the respective nodes to determine spectral embeddings that define respective feature vectors for each node, wherein the spectral embeddings are determined based on computing a similarity measure between the time series data pertaining to each pair of nodes of the plurality of nodes.

9. The method according to claim 1,
    wherein the measurement signals pertaining to respective nodes comprise time series data,
    wherein the node features are defined by data samples of the time series data pertaining to the respective nodes, and
    wherein the graph neural network includes a recurrent neural network-based graph neural network.

10. The method according to claim 1, wherein the measurement signals are associated with multiple electrical quantities defining multiple channels of time series data, wherein the node features are defined by concatenating feature vectors derived from the individual channels.

11. The method according to claim 1, wherein the one or more electrical quantities being measured include active power and voltage at the nodes.

12. The method according to claim 1, wherein the one or more electrical quantities being measured include only active power at the nodes.

13. The method according to claim 1, wherein the power distribution grid comprises measured and unmeasured nodes, wherein the graph representations include only measured nodes.

14. A non-transitory computer-readable storage medium including instructions that, when processed by a computing system, configure the computing system to perform the method according to claim 1.

15. A system for identifying a topology of a power distribution grid comprising a plurality of transformers, the system comprising:
    measurement devices for communicating measurement signals of one or more electrical quantities pertaining to a plurality of nodes of the power distribution grid, and
    a computing system, comprising:
        one or more processors, and
        a memory storing algorithmic modules executable by the one or more processors, the algorithmic modules comprising:
            a graph generator engine configured to generate a graph representation using the measurement signals and grid topological information, wherein the measurement signals pertaining to respective nodes are used to derive node features and wherein the grid topological information is used to encode edges representing connections between the nodes, the encoding configured to distinguish certain connections from uncertain connections, and
            a node-transformer mapping engine configured to utilize a graph neural network for processing the graph representation to classify the nodes and output a mapping of each of the nodes to one of the transformers, whereby a status of the uncertain connections is determined, wherein the measurement signals are continuously sampled over a moving time window to detect power distribution grid topology changes in real time.

* * * * *